No. 664,762. Patented Dec. 25, 1900.
A. KITSON.
VAPORIZING APPARATUS.
(Application filed Feb. 23, 1900.)
(No Model.)
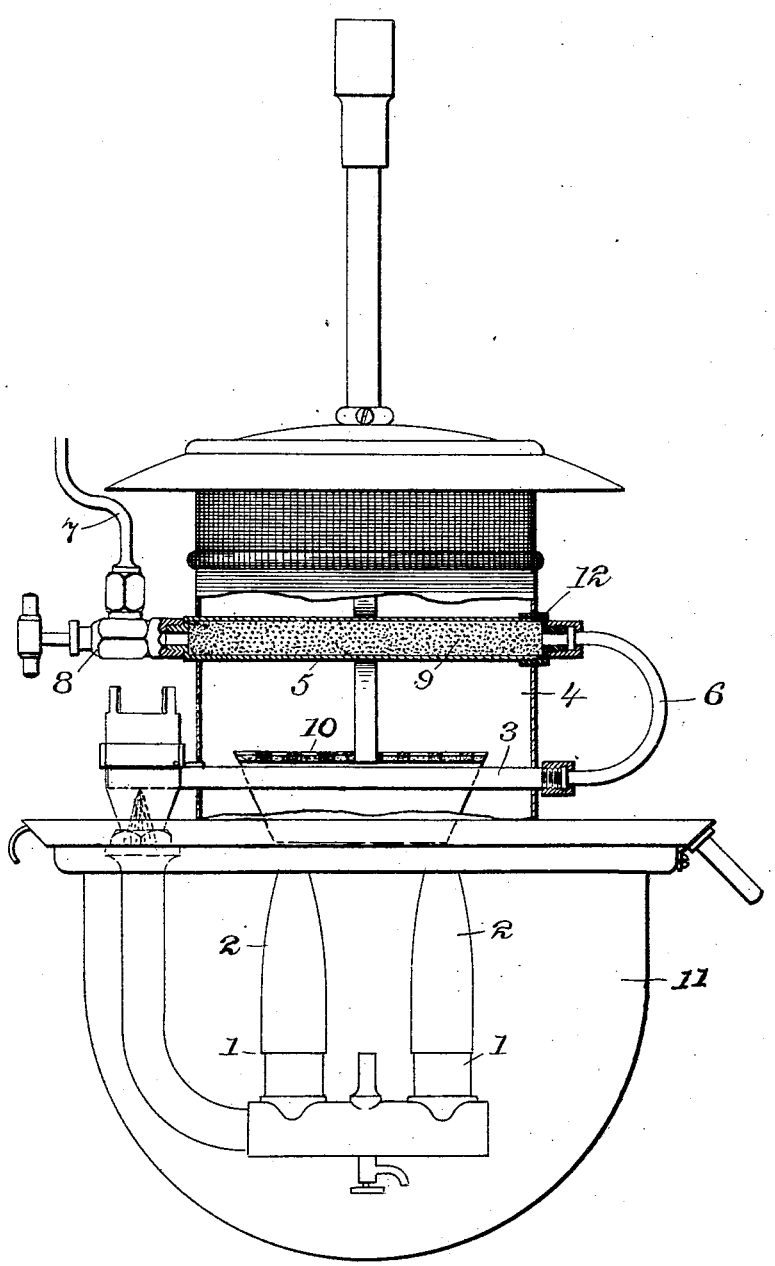
WITNESSES:
L. E. Pearson
W. H. Pumphrey
INVENTOR
Arthur Kitson
BY
ATTORNEY

UNITED STATES PATENT OFFICE.

ARTHUR KITSON, OF PHILADELPHIA, PENNSYLVANIA, ASSIGNOR TO THE KITSON HYDROCARBON HEATING AND INCANDESCENT LIGHTING COMPANY, OF SAME PLACE AND CHARLESTON, WEST VIRGINIA.

VAPORIZING APPARATUS.

SPECIFICATION forming part of Letters Patent No. 664,762, dated December 25, 1900.

Application filed February 23, 1900. Serial No. 6,199. (No model.)

*To all whom it may concern:*

Be it known that I, ARTHUR KITSON, a subject of the Queen of Great Britain, and a resident of Philadelphia, (Germantown,) county of Philadelphia, State of Pennsylvania, have invented certain new and useful Improvements in Vaporizing Apparatus, of which the following is a specification.

My invention relates to vapor-burning apparatus in general, and more specifically consists of an improved apparatus for use in connection with vapor-burning lamps. Its most important application is to that species of vapor-burning lamp employing incandescent mantles and vaporizing the fluid hydrocarbon fed to it by the heat generated by the burner itself. One difficulty which is encountered in the commercial operation of all lamps of this class is that all fluid hydrocarbons, more especially the heavier ones, such as kerosene, tend to deposit a certain amount of solid carbon in the vaporizing tube or chamber. The accumulation of such solid matter interferes with the efficient operation of the lamp and ultimately tends to stop said operation by clogging up the fine orifice through which the vapor is discharged. I have found that certain substances when heated in contact with the fluid hydrocarbon, such as kerosene, will prevent the deposit of the solid carbon particles, and while I am not absolutely certain of the exact reaction which produces this result I am inclined to believe that it is due to the fact that the said substances give off a gas when heated which tends to combine with the fine molecules or atoms of carbon carried in the kerosene and to form therewith a gas, thus carrying them forward in the gaseous state to the burner and preventing their deposit as solid matter. The substances with which I have so far experimented and obtained the best results are various oxids which when heated would tend to give off oxygen which would combine with the carbon to form carbon-monoxid or other gas. I find the best results to be produced by what is commonly called "iron sponge," which is a hydrated oxid of iron. This material or other similar substance I prefer to use in a finely-divided condition and to place the same in a heating-chamber to which the oil-supply is fed. This heating-chamber may or may not be separate from the vaporizing-tube proper; but I prefer to make it separate from the vaporizing-tube proper and to locate it in the heating zone of the vapor-burner, but at a distance farther from the burner than the vaporizing-tube proper is located, the line of connections being such that the oil passes first through this separate heating-chamber, where it is vaporized fully or partially, and then goes to the vaporizing-tube proper, where its vaporization is completed or the vapor already formed is superheated, so as to cause the same to more nearly approach the condition of a fixed gas.

The preferred form of apparatus embodying my invention is illustrated in the accompanying drawing, in which one form of vapor-burning lamp is shown having vapor-burners 1 1 preferably coöperating with incandescent mantles 2 2, said burners being arranged beneath a vaporizing-tube 3. This vaporizing-tube is arranged horizontally, extending across the chimney 4 of the lamp, and at a higher point in said chimney is located the second heating-chamber 5. This heating-chamber is connected to the vaporizing-tube by any convenient connection, such as the bent tube 6, and the oil-supply is fed to the opposite end of the heating-chamber 5 through the tube 7 and is controlled by the valve 8.

Within the heating-chamber 5 I place a considerable quantity of finely-divided material 9, which is of the character before described—to wit, iron sponge or other material which when heated will give off oxygen or other gas that will combine with the carbon particles to form carbon-monoxid or other gas.

I preferably place the heat-shield 10 over the vaporizing-tube 3 and between it and the heating-chamber 5.

The vapor-burners are preferably surrounded and protected by the glass globe 11. At one end of the heating or filter chamber 5 I prefer to leave an opening of the full diameter of said tube and close said opening by means of the removable screw-cap 12, to which the pipe 6 may also be connected. The advantage of this is that on removing said cap the material 9 can be freely taken out.

The method of operation of my invention is therefore as follows: The lamp being in operation, the vaporizing-tube 3 will be subjected to a high degree of heat, while the heating-chamber 5 is subjected to a less degree. The oil entering through the pipe 7 filters through the mass of material 9 in the heating-chamber 5, so that every particle of it comes into intimate contact with said material. The heat to which the material is subjected is sufficient to cause the carbon particles to unite with the material, and thus enhance the filtering action, or to liberate the oxygen or other gas and produce a combination between it and the carbon particles, so that they form a gas. The wholly or partially vaporized oil and the gas formed as above explained then pass through the tube 6 into the intensely-hot vaporizing-tube proper, 3, where the vaporization is completed and superheating of the vapor and gases is produced. The jet of vapor is then discharged from the far end of the vaporizing-tube and conducted to the vapor-burners in the well-known manner. The deposition of free carbon is thus partly or wholly prevented, and if any such free carbon is deposited it is collected in the larger heating-chamber 5, where it will have less tendency to clog the action of the lamp than would be the case if it passed into the smaller vaporizing-tube 3 or accumulated about the fine discharge-orifice in the farther end of said tube. Moreover, such of the free carbon as is deposited in the heating-chamber 5 will combine with the loose material 9 and can be readily removed from said chamber with the material to which it adheres, while if the free carbon is deposited in the hotter vaporizing-tube 3 it deposits upon the walls thereof and forms a solid mass, which cannot be dug out. Such deposit on the wall of the vaporizing-tube also interposes a non-conducting shell between the walls of the tube and the vapor or oil and diminishes the vaporizing action of the entire apparatus.

It is well known, of course, that iron when heated will absorb carbon, as this is the basis of the whole art of tempering steel and forming steel from iron. It is also well known that iron and steel will absorb carbon when heated and brought into contact with oil, as this is the method pursued in so-called "oil-tempering." It is therefore evident that a part of the beneficial action of my invention arises from this action of the iron sponge in absorbing free carbon when it is heated in contact with the oil or vapor, the porous nature of the sponge causing this action to occur in the highest degree. In proof of this I may state that I have seen the ordinary iron parts of my lamps which have been exposed in a heated condition to the action of the oil and vapor for some time become so impregnated with carbon and consequently so highly tempered as to be as brittle as glass.

The advantages of my invention, as indicated, comprise the production of an apparatus which is highly efficient in that it consumes all the combustible material in the oil and is also economical in that it requires little attention. My improved apparatus will run for a much longer time without attention than does the ordinary vapor-burning lamp and does not require the addition of mechanism for cleaning out the vapor-discharge orifice. Furthermore, if eventually the apparatus does become clogged up the clogging occurs in the heating-chamber 5 as a result of the filling up of all the interstices between the particles of the filling 9, and the material so accumulating can be readily removed with said filling material and a new charge introduced without necessitating the renewal of any of the permanent parts of the lamp.

It is evident, of course, that various changes could be made in the details of construction illustrated without departing from the spirit and scope of my invention so long as the principle of operation above described is maintained. The relative arrangement and proportion of parts might be varied and the location of the material 9 changed. Other materials than iron sponge might be employed, so long as they would have the effect of combining with the free carbon to produce the result described. All such modifications I should still consider within my invention.

Having therefore described my invention, what I claim as new, and desire to protect by Letters Patent, is—

1. The combination with a vapor-burning apparatus of a heating-chamber through which the oil-supply is fed, and a filling for said chamber comprising material which, on the application of heat, gives off a gas capable of combining with carbon.

2. The combination with a vapor-burning apparatus of a heating-chamber through which the oil-supply is fed, and a filling for said chamber comprising material which, on the application of heat, gives off oxygen.

3. The combination with a vapor-burning apparatus of a heating-chamber through which the oil-supply is fed, and a body of iron sponge located in said chamber.

4. The combination with a vapor-burning apparatus of a heating-chamber through which the oil-supply is fed, and a filling for said chamber comprising material which, on the application of heat, gives off a gas capable of combining with carbon, said heating-chamber being located within the heating zone of the said vapor-burning apparatus.

5. The combination of the vapor-burning apparatus, the vaporizing-tube, a second heating-chamber farther removed from the vapor-burner, connections such that the oil-supply is passed through the heating-chamber to the vaporizing-tube, and a filling for the heating-chamber comprising a material which, on the application of heat, gives off a gas capable of combining with the carbon deposited by the oil.

6. The combination of the vapor-burning apparatus, the vaporizing-tube, a second heating-chamber farther removed from the vapor-burner, connections such that oil-supply is passed through the heating-chamber to the vaporizing-tube, and a filling for the heating-chamber comprising a material which, on the application of heat, gives off a gas capable of combining with the carbon deposited by the oil, together with the heat-shield interposed between the vaporizing-tube and the heating-chamber.

7. The combination of a vapor-burning apparatus, the oil-supply pipes, and a filter-chamber in the line of connections, located above the vapor-burning apparatus and within the heating zone thereof, together with a mass of material which combines with carbon when heated, located in said filter-chamber.

Signed by me at New York, N. Y., this 8th day of February, 1900.

ARTHUR KITSON.

Witnesses:
W. H. PUMPHREY,
L. E. PEARSON.